Dec. 5, 1944.  C. E. WISHER  2,364,333
FISH SCALING AND CLEANING DEVICE
Filed Aug. 3, 1943
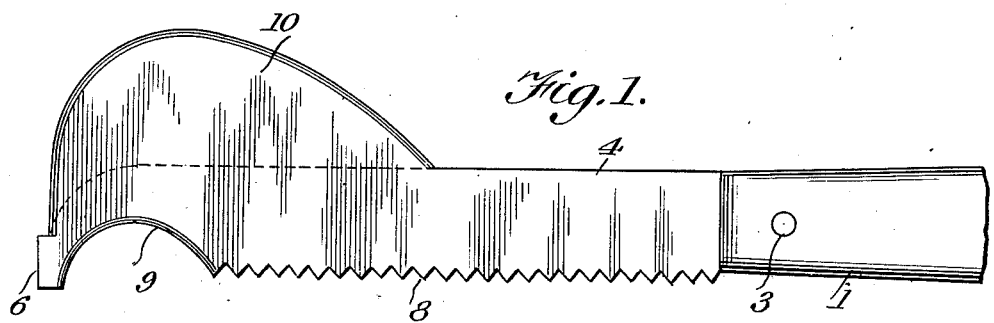
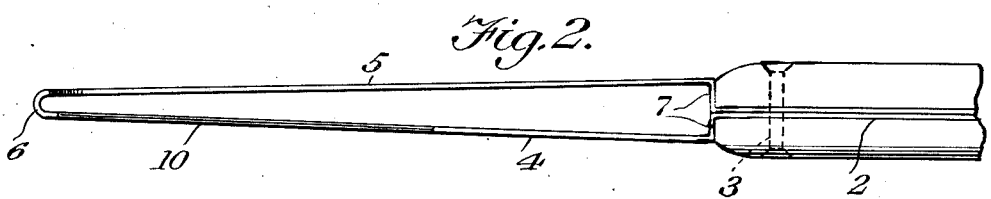
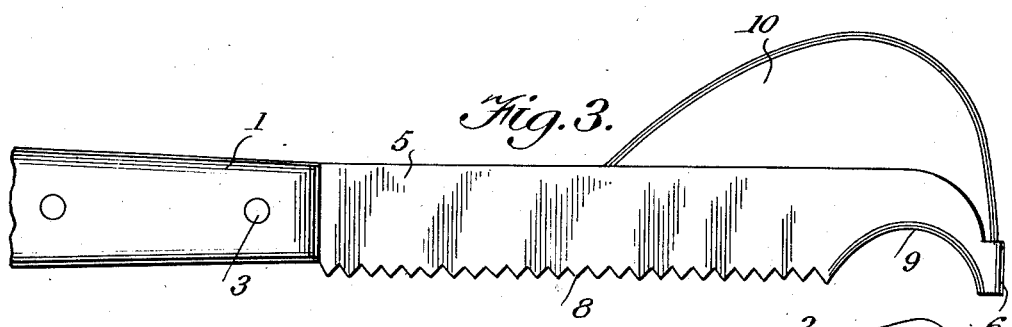
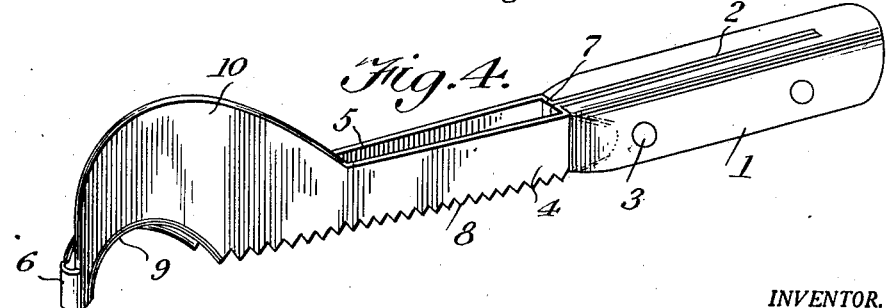
INVENTOR.
Charles E. Wisher
BY
Victor J. Evans & Co.
ATTORNEYS Patented Dec. 5, 1944

2,364,333

UNITED STATES PATENT OFFICE 2,364,333

FISH SCALING AND CLEANING DEVICE

Charles E. Wisher, Spencerville, Ohio

Application August 3, 1943, Serial No. 497,192

3 Claims. (Cl. 17—7)

This invention relates to fish scaling and cleaning devices, and its general object is to provide a device of that character which is not only efficacious for scaling, cutting, slitting and removing the entrails of fish, but also for cutting away the fins, including all parts thereof embedded within the flesh, in an easy and expeditious manner. Thus it will be seen that my device is capable of use for completely preparing a fish for cooking.

An important object is to provide a device of the character set forth, that includes a pair of spaced blades each having a serrated edge and disposed in side by side relation, and such arrangement materially facilitates scaling fish, without cutting the skin or unduly mutilating the same, and the blades are recessed and joined together at their outer ends to provide a hook like cutting and fin removing means.

Another object is to provide a fish scaling and cleaning device that is simple in construction, inexpensive to manufacture, and extremely efficient in use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a side elevation of the device which forms the subject matter of the present invention, with the handle broken away.

Figure 2 is a top plan view thereof.

Figure 3 is a view looking toward the opposite side of Figure 1.

Figure 4 is a perspective view of the device.

Referring to the drawing in detail, the reference numeral 1 indicates an elongated handle which is shown as being kerfed along the longitudinal center thereof from its inner end, for a portion of its length, to provide a seat for a tang 2 of the blades, the tang being fixed within the kerf by suitable securing means 3.

The blades which are indicated by the reference numerals 4 and 5 respectively, are integral with each other and are preferably made from a single strip of suitable metal, the strip being looped as at 6 in curved formation midway its ends and the blades extend rearwardly from the loop in spaced diverging relation with respect to each other, as best shown in Figure 2. At the rear ends of the blades, the strip portions are bent inwardly toward each other at right angles to the blades to provide shoulders 7 abutting the inner end of the handle and from the shoulders the strip portions are further bent at right angles to the shoulders and directed rearwardly in face to face engagement to provide the tang 2.

The lower edges of the blades are arranged in the same plane from the shoulders 7, for a portion of their length and those portions are straight and serrated or toothed as at 8 for use in scaling fish, as will be apparent. From the forward ends of the serrated edges the blades are recessed as at 9 in arcuate formation to form the outer end portions of the blades in hook like formation, and the edges of the recesses, as well as the lower edge of the loop 6, are beveled to provide cutting edges. Those cutting edges are primarily designed to cut into the flesh of the fish for removing fins therefrom, and for that purpose, the device is held, with the blades disposed substantially perpendicular to the fish and the beveled edge of the loop is then inserted into the flesh at one end of a fin, with the latter extending between the blades, thence the loop is drawn through the flesh for cutting the fin therefrom.

The blade 4 is formed with an outwardly directed projection 10 extending longitudinally of the upper portion thereof from substantially midway its ends to adjacent the loop 6. The edge of the projection is of arcuate formation and is beveled to provide a cutting edge that is not only for use in slitting a fish preparatory to removing the entrails, but for cutting the head and tail portions from the fish. It might be mentioned here, that the hook provided by the recesses 9 is very useful for removing the entrails, while the edge of the portion 10 can likewise be used in an efficient manner for scraping the inner wall of the fish to remove foreign matter therefrom.

From the above description and disclosure in the drawing, it is believed that the use and advantages of the respective elements of my device will now be obvious, therefore further comments along those lines are deemed unnecessary.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. In a fish scaling and cleaning device, a handle, a pair of blades secured to the handle and extending therefrom in spaced relation to each other and in close proximity throughout their length, one of said blades being formed with a projection extending substantially midway its ends to the outer end thereof, and said projection having an arcuate beveled cutting edge throughout its length.

2. A fish scaling and cleaning device comprising an elongated handle, a pair of blades formed from a single strip of material looped in curved formation midway its ends, the portions of the strip extending from the loop being disposed in spaced diverging relation to each other and providing the blades, said portions from the inner ends of the blades being bent inwardly toward each other at right angles to the blades to provide shoulders engaging the inner end of the handle, said handle being kerfed along the longitudinal center thereof from its inner end for a portion of its length, and said portions extending outwardly from and at right angles to the shoulders and engaging each other to provide a tang fixed within the kerf.

3. A fish scaling and cleaning device comprising the structure of claim 1, said blades being serrated for a portion of their length to provide scaling means, a curved loop connecting the outer ends of said blades, said blades being recessed from the curved loop for a portion of their length and the edges of the recesses and loop being beveled to provide fin removing means, one of said blades being formed with a projection extending therefrom in opposed relation to the recess thereof, and said projection having an outwardly directed beveled cutting edge.

CHARLES E. WISHER.